(12) United States Patent
Bowen

(10) Patent No.: US 9,407,505 B2
(45) Date of Patent: Aug. 2, 2016

(54) CONFIGURATION AND VERIFICATION BY TRUSTED PROVIDER

(71) Applicant: Amazon Technologies, Inc., Reno, NV (US)

(72) Inventor: Peter Zachary Bowen, Bainbridge Island, WA (US)

(73) Assignee: Amazon Technologies, Inc., Reno, NV (US)

(*) Notice: Subject to any disclaimer, the term of this patent is extended or adjusted under 35 U.S.C. 154(b) by 417 days.

(21) Appl. No.: 13/784,276

(22) Filed: Mar. 4, 2013

(65) Prior Publication Data

US 2014/0250215 A1  Sep. 4, 2014

(51) Int. Cl.
*H04L 12/24* (2006.01)
*G06F 21/57* (2013.01)

(52) U.S. Cl.
CPC ............ *H04L 41/0866* (2013.01); *G06F 21/57* (2013.01); *H04L 41/28* (2013.01)

(58) Field of Classification Search
CPC combination set(s) only.
See application file for complete search history.

(56) References Cited

U.S. PATENT DOCUMENTS

| 8,125,243 | B1 | 2/2012 | Wright |
| 2005/0223362 | A1* | 10/2005 | Whitlock et al. ............. 717/126 |
| 2008/0235793 | A1 | 9/2008 | Schunter et al. |
| 2009/0300049 | A1 | 12/2009 | Zhang et al. |
| 2009/0328164 | A1 | 12/2009 | Sunder et al. |
| 2010/0293373 | A1 | 11/2010 | McBrearty et al. |
| 2012/0014256 | A1* | 1/2012 | Bancila et al. ................ 370/241 |
| 2012/0054551 | A1* | 3/2012 | Gao et al. ...................... 714/38.1 |
| 2012/0072985 | A1* | 3/2012 | Davne et al. .................... 726/22 |

* cited by examiner

*Primary Examiner* — Larry Donaghue
(74) *Attorney, Agent, or Firm* — Baker & Hostetler LLP

(57) ABSTRACT

A computing resource is loaded with the code or data, and an audited record of the loaded code or data is generated. Furthermore, a configuration integrity is generated based on the record of the loaded code or data. The configuration integrity verifier is sent to a requestor for verification of the code or data, the configuration integrity verifier being usable as a trusted verification of the loaded code or data.

22 Claims, 7 Drawing Sheets

CONFIGURATION AND VERIFICATION BY TRUSTED PROVIDER

BACKGROUND

A data center is a facility that houses computer systems and various networking, storage, and other related components. Data centers may, for example, provide computing services to businesses and individuals as a remote computing service or to provide "software as a service" (e.g., cloud computing). The computing resources provided by a data center may include various types of resources, such as data processing resources, data storage resources, data communication resources, and the like.

To facilitate increased utilization of data center resources, virtualization technologies may allow a single physical computing machine to host one or more instances of virtual machines that appear and operate as independent computer machines to a connected computer user. With virtualization, the single physical computing device can create, maintain, or delete virtual machines in a dynamic manner. When a customer of a data center requests a new virtual machine instance, the data center may provide a virtual machine management service that identifies a "slot" for executing the new instance. Customers may sometimes request a virtual machine instance with a particular configuration. In some cases, the configuration may include software and data that is provided by the customer or by a third party supplier.

BRIEF DESCRIPTION OF DRAWINGS

Throughout the drawings, reference numbers may be reused to indicate correspondence between referenced elements. The drawings are provided to illustrate example embodiments described herein and are not intended to limit the scope of the disclosure.

DETAILED DESCRIPTION

Hardware and software technologies for utilization and verification of trusted platforms are generally described herein. Embodiments of systems and methods are described for validating, by a computing resource service provider, that a computing resource is in a known or desired configuration. For example, a confirmation may be provided that a virtual machine has booted into a known configuration. In various embodiments, a computing resource service provider, such as a data center, may act as a trusted third party that interacts with load and configuration processes to provide a trusted third party validation of a configuration. In some embodiments, the third party validation may be provided by a process executing in the data center. For example, a load verification service or a configuration verification service may be implemented that interacts with the boot process and can be queried out-of-band. The load verification service or configuration verification service may be responsible for provisioning a requested virtual resource, setting up a boot-loader, and interacting with the virtual resource. The boot-loader may communicate with the load verification service or configuration verification service to record or audit the detected configuration. The values provided by the boot-loader are typically write-once and are only to be reset by rebooting the system. The load verification service or configuration verification service may also generate and provide cryptographic checksums of loaded files. The load verification service or configuration verification service may provide the checksum values and the boot configuration to an authorized party, allowing the authorized party to determine the integrity of the boot configuration of the virtual resource without depending on their own verification methods.

Figure 1:
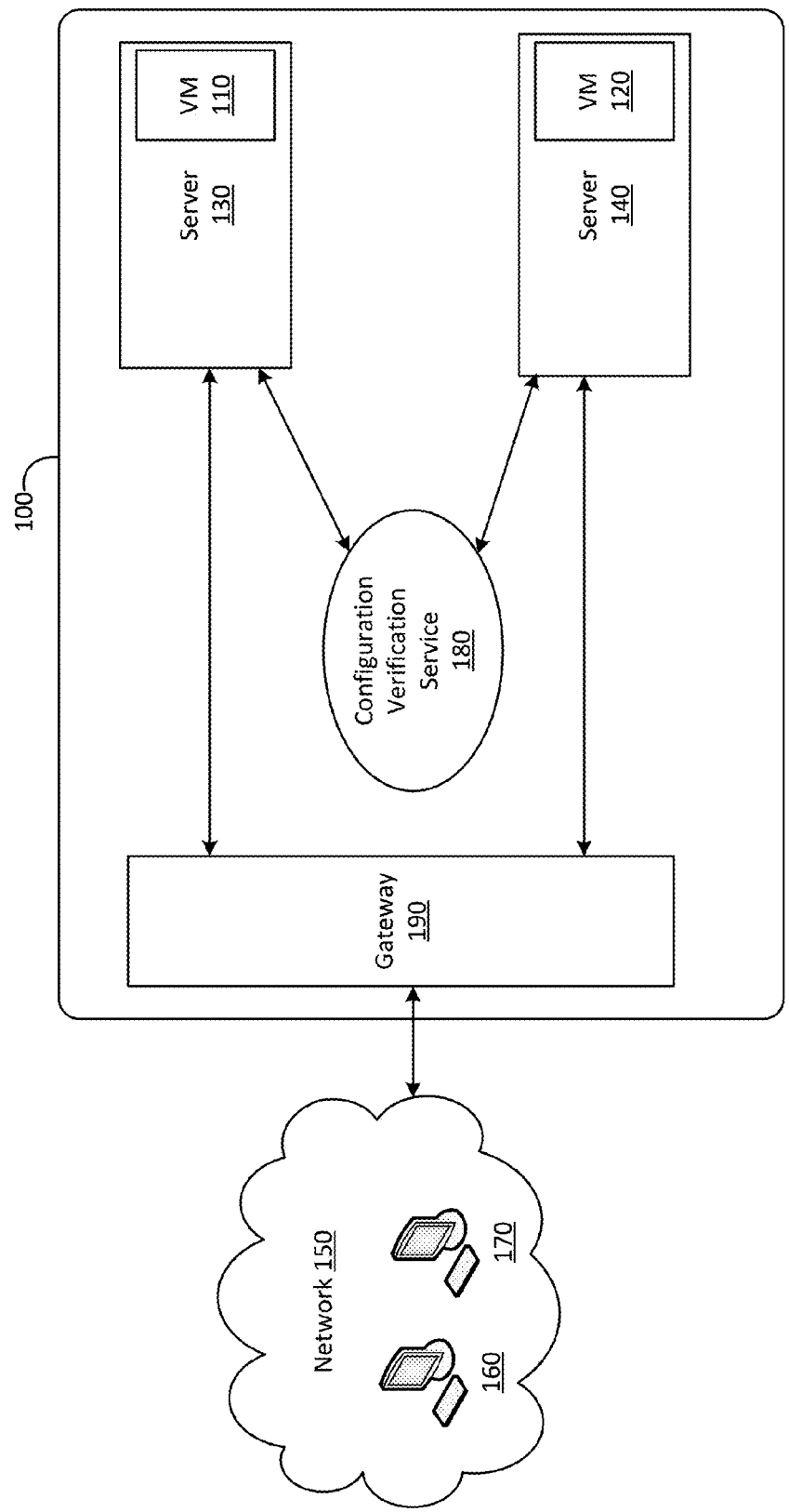
FIG. 1 is a diagram illustrating a mechanism for providing a configuration verification service in accordance with the present disclosure.

FIG. 1 is a diagram illustrating a system 100 including a mechanism for providing a load verification service or configuration verification service in accordance with the present disclosure. In the present disclosure, a load verification service may also be referred to as a third-party verification service or a configuration verification service. The terms may be used interchangeably. Referring to FIG. 1, system 100 may include virtual machine instances 110 and 120 that may execute, for example, on one or more server computers 130 and 140. It will be appreciated that some embodiments may involve additional virtual machine instances that may be instantiated on additional server computers in system 100.

FIG. 1 also illustrates a public network 150 that may include one or more computing devices such as computers 160 and 170. According to one embodiment, virtual machine instance 110 may be configured to provide computing services to a computer user (not shown) of public network 150 via a gateway 190 and computers 160 and 170. For example, virtual machine instance 110 may provide a set of remote access enterprise applications to a group of users who may, for example, be employees of an enterprise customer.

A customer, user, administrator or any computing resource in system 100 may request a resource instance with a particular software configuration. In one embodiment, a configuration verification service 180 may be provided that interacts with the boot and load process. The requested virtual resource can be provisioned by system 100 and configuration verification service 180 may be configured to interact with the virtual resource. For example, an instance manager (e.g., a hypervisor or a Dom0) can identify the files loaded onto the virtual machine during boot, track the detected configuration and report a list of files or send the files themselves to the configuration verification service 180. Similarly, the boot loader used to launch the instance may be configured to communicate with configuration verification service 180 to track and report the detected configuration. In an embodiment, the instance manager or configuration verification service 180 may provide an audit of loaded files and generate a checksum. Configuration verification service 180 may provide the audit results and checksum values to an authorized party, allowing the authorized party to verify the integrity of the boot configuration of the virtual resource. By providing the configuration verification, system 100 can efficiently provide a trusted confirmation of a particular configuration. The trusted confirmation may be requested directly by a customer of the data center, by an administrator of the data center, a provider or vendor of a particular software product, or any computing resource within the data center such as server 130. Server 130 may also send a request on behalf of itself or on behalf of other servers.

Various aspects of the disclosure are described with regard to certain examples and embodiments, which are intended to illustrate but not to limit the disclosure.

A data center may provide one or more services accessible via the Internet such as various types of cloud-based computing or storage to a distributed set of clients. The data center may host various resource pools, such as collections of physical and virtualized computer servers, storage devices, networking equipment and the like, needed to implement and distribute the services offered by the data center. The data center may also provide private and isolated sections of its data services in which a customer may launch computing resources in a virtual network defined by the user. In some embodiments, different parts of the functionality of the network interface virtualization service may be incorporated within several different cooperating software components and/or devices, such as modules of hypervisor or operating system software running on various hardware platforms of the provider network, router software on edge devices, and the like.

In one embodiment, the data center may provide customers with one or more instances of virtualized computer resources and/or storage resources, each of which may require network addressability to allow the customers to interact with the resources.

Figure 2:
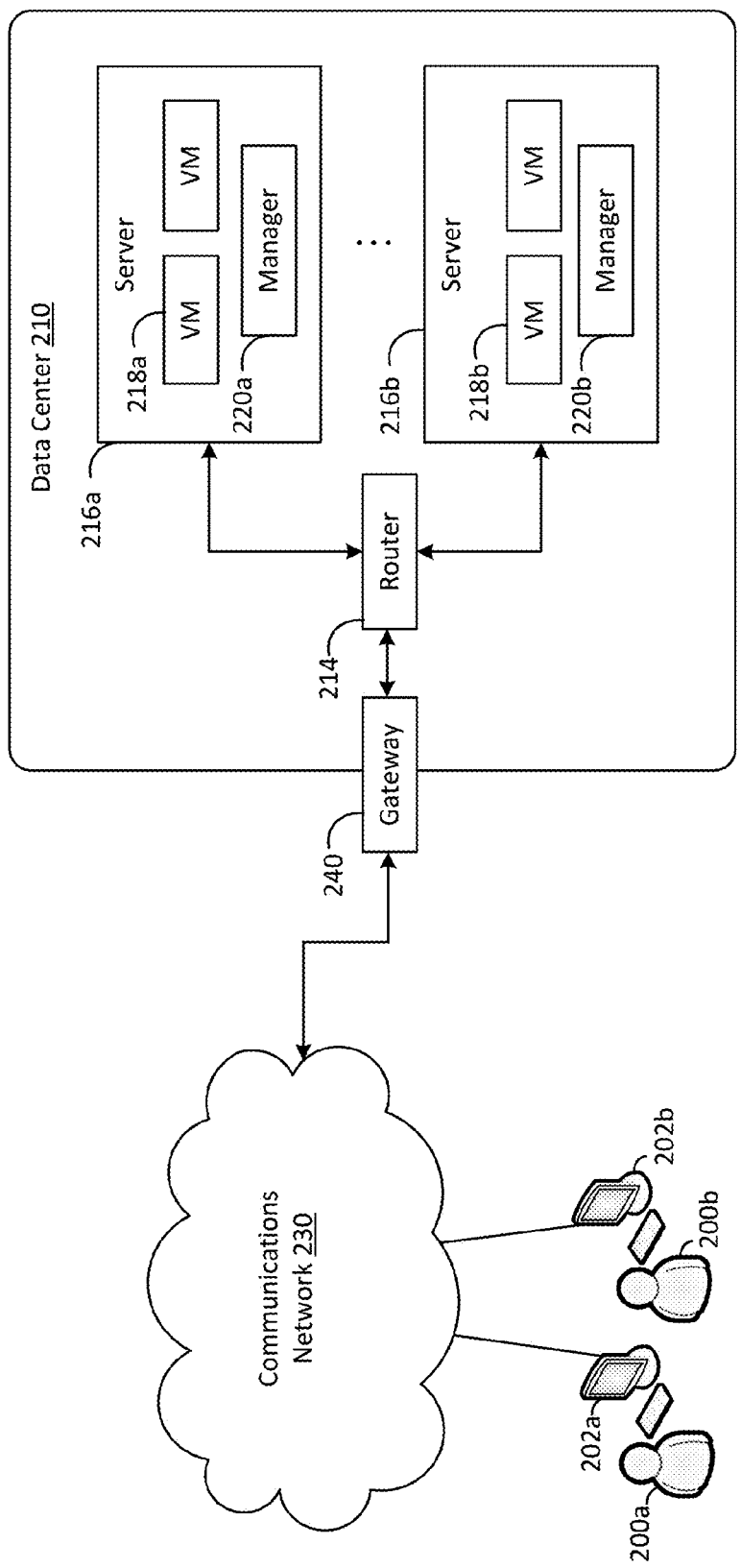
FIG. 2 is a diagram illustrating an example computer system that may be used in some embodiments.

FIG. 2 illustrates an example computing environment in which the embodiments described herein may be implemented. FIG. 2 is a diagram schematically illustrating an example of a data center 210 that can provide computing resources to users 200a and 200b (which may be referred herein singularly as "a user 200" or in the plural as "the users 200") via user computers 202a and 202b (which may be referred herein singularly as "a computer 202" or in the plural as "the computers 202") via a communications network 230. Data center 210 may be configured to provide computing resources for executing applications on a permanent or an as-needed basis. The computing resources provided by data center 210 may include various types of resources, such as data processing resources, data storage resources, data communication resources, and the like. Each type of computing resource may be general-purpose or may be available in a number of specific configurations. For example, data processing resources may be available as virtual machine instances. The instances may be configured to execute applications, including Web servers, application servers, media servers, database servers, and the like. Data storage resources may include file storage devices, block storage devices, and the like.

Each type or configuration of computing resource may be available in different sizes, such as large resources—consisting of many processors, large amounts of memory, and/or large storage capacity—and small resources—consisting of fewer processors, smaller amounts of memory, and/or smaller storage capacity. Customers may choose to allocate a number of small processing resources as Web servers and/or one large processing resource as a database server, for example.

Data center 210 may include servers 216a and 216b (which may be referred herein singularly as "a server 216" or in the plural as "the servers 216") that provide computing resources available as virtual machine instances 218a and 218b (which may be referred herein singularly as "a virtual machine instance 218" or in the plural as "the virtual machine instances 218"). The virtual machine instances 218 may be configured to execute applications, including Web servers, application servers, media servers, database servers, and the like. Other resources that may be provided include data storage resources (not shown), and may include file storage devices, block storage devices, and the like.

The availability of virtualization technologies for computing hardware has provided benefits for providing large scale computing resources for customers and allowing computing resources to be efficiently and securely shared between multiple customers. For example, virtualization technologies such as those provided by VMware or other virtualization systems may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that spans multiple distinct physical computing systems.

Referring to FIG. 2, communications network 230 may, for example, be a publicly accessible network of linked networks and possibly operated by various distinct parties, such as the Internet. In other embodiments, communications network 230 may be a private network, such as, for example, a corporate or university network that is wholly or partially inaccessible to non-privileged users. In still other embodiments, communications network 230 may include one or more private networks with access to and/or from the Internet.

Communication network 230 may provide access to computers 202. User computers 202 may be computers utilized by users 200 or other users of data center 210. For instance, user computer 202a or 202b may be a server, a desktop or laptop personal computer, a tablet computer, a wireless telephone, a personal digital assistant (PDA), an e-book reader, a game console, a set-top box, or any other computing device capable of accessing data center 210. User computer 202a or 202b may connect directly to the Internet (e.g., via a cable modem or a Digital Subscriber Line (DSL)). Although only two user computers 202a and 202b are depicted, it should be appreciated that there may be multiple user computers.

User computers 202 may also be utilized to configure aspects of the computing resources provided by data center 210. In this regard, data center 210 might provide a Web interface through which aspects of its operation may be configured through the use of a Web browser application program executing on user computer 202. Alternatively, a stand-alone application program executing on user computer 202 might access an application programming interface (API) exposed by data center 210 for performing the configuration operations. Other mechanisms for configuring the operation of the data center 210, including deploying updates to an application, might also be utilized.

Servers 216 shown in FIG. 2 may be standard servers configured appropriately for providing the computing resources described above and may provide computing resources for executing one or more applications. In one embodiment, the computing resources may be virtual machine instances 218. In the example of virtual machine instances, each of the servers 216 may be configured to execute an instance manager 220a or 220b (which may be referred herein singularly as "an instance manager 220" or in the plural as "the instance managers 220") capable of executing the virtual machine instances 218. The instance managers 220 may be a virtual machine monitor (VMM) or another type of program configured to enable the execution of virtual machine instances 218 on server 216, for example. As discussed above, each of the virtual machine instances 218 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 210 shown in FIG. 2, a router 214 may be utilized to interconnect the servers 216a and 216b. Router 214 may also be connected to gateway 240, which is connected to communications network 230. Router 214 may manage communications within networks in data center 210, for example by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 2 has been greatly simplified and that many more networks and networking devices may be utilized to interconnect the various computing systems disclosed herein. These network topologies and devices should be apparent to those skilled in the art.

It should also be appreciated that data center 210 described in FIG. 2 is merely illustrative and that other implementations might be utilized. Additionally, it should be appreciated that the functionality disclosed herein might be implemented in software, hardware, or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

The capacity of purchased computing resources provided by data center 210 can be scaled in response to demand. In this regard, scaling refers to the process of instantiating (which may also be referred to herein as "launching" or "creating") or terminating (which may also be referred to herein as "de-scaling") instances of computing resources in response to demand. In this manner, the capacity of resources purchased by a customer of data center 210 can be scaled on-demand.

Auto scaling is one mechanism for scaling computing resources in response to increases or lulls in demand for these resources. Auto scaling allows customers of data center 210 to configure data center 210 to scale their purchased computing resources according to conditions defined by the customer. For instance, rules may be defined for scaling up capacity in a particular manner in response to the occurrence of specified conditions, such as a spike in demand. Similarly, rules might also be defined to scale down capacity in a particular manner in response to the occurrence of other conditions, such as a lull in demand. The mechanisms disclosed herein for launching virtual machine instances might be utilized when instances are manually launched by a customer or when instances are launched by an auto scaling component in data center 210.

Data center 210 may also be configured with a deployment component to assist customers in the deployment of new instances of computing resources. The deployment component may receive a configuration from a customer that includes data describing how new instances should be configured. For example, the configuration might specify one or more applications or software components that should be installed in new instances, provide scripts and/or other types of code to be executed in new instances, provide cache warming logic specifying how an application cache should be prepared, and other types of information. The deployment component utilizes the customer-provided configuration and cache warming logic to launch, configure, and prime new instances of computing resources.

In many cases, a customer of a data center, or a software or data supplier to a data center, may request verification that a specified computing configuration has not been modified or tampered with. For example, a customer may want to receive assurances that a specified operation system has been loaded. In some embodiments, a customer may want to receive assurances that a particular software application has been loaded and has not been tampered with. A data center providing, for example, cloud computing services, may be in an advantageous position to provide such assurances. The service provider or data center typically owns and operates the computing infrastructure while the content provider may only provide software and/or data to the service provider or data center. Many software/data suppliers such as content providers who distribute software and content to data centers and cloud-based services may request assurances that computing services provided by the data centers and cloud-based services meet certain criteria such as data-load integrity, ability to handle certain data, and the like.

In a cloud-based service that provides virtualized services, the position of the service provider with respect the software/data loading process places the provider in a position to provide trusted services by and for a client. Many organizations and businesses rely on the computing resources provided by a service provider to provide computing and information services to support their day-to-day operations. The computing services provided by service providers are extremely important to businesses as the continued and reliable availability of the computing services are important to the business's ongoing operations. Security is an important concern not only for service reliability but also for the protection of a customer's valuable and proprietary information. It is thus necessary that customers be able to trust the reliability and security of the computing services provided by the data center. For example, if a customer requests installation of a specified operating system, the cloud-based service is trusted to launch a virtual machine with the specified operating system. The trust that is assumed when a customer signs up for cloud-based services may thus be leveraged to allow for transfer of that trust, by levering the reputation of the service provider, to third parties via the trusted services provided by the service provider. For example, the service provider can audit and verify a customer's software configuration and provide a unique identifier for the configuration that can be used as a credential to a third party verifying the integrity of the configuration. The service provider thus takes on the role of an auditor with respect to the services provided by customers who host their software on the service provider's resources.

In one embodiment, a customer may request an instance and request that a particular software configuration and data be deployed. A server operator in the data center may be tasked with loading a customer's requested software and data on the instance. Furthermore, the customer can request that the data center provide an audit certificate. The audit certificate may in some embodiments be a digital certificate, but it can be appreciated that any type of certificate, electronic or otherwise, may be provided. The audit certificate may then be presented to a third party to verify what was deployed. Since the third party trusts the service provider, the audit certificate may be accepted as confirmation of the deployed software and/or data.

Thus in various embodiments, the service provider may act as a trusted party that verifies what was deployed and provide a means for providing trusted verification of the deployment. In some embodiments, a customer that uses resources operated as a service by a service provider may use the above described audit certificate mechanism to confirm to its users that the instance is utilizing software that is loaded and verified by the service provider. For example, a customer who provides digital video or music services may provide specialized media player software to its users for rendering the video or music files while preventing unauthorized copying of the files. In order to provide assurances to the video or music provider that the users are using legitimate rendering software that has not been tampered with, the service provider may provide audit certificates to the video or music provider to attest that instances of the rendering software that are hosted on the service provider's computing resources have been loaded and verified to a known configuration.

Thus, as the owner/operator of the computing hardware that deploys the software and data, the service provider can audit the deployed software and data using verification methodologies such as computing a configuration integrity verifier. In one embodiment, a checksum of the loaded software and data may be computed. A checksum is a value computed from a block of data that can be used to detect changes or errors in the data during transmission or storage. The integrity of the transmitted or stored data is checked by recomputing the checksum and comparing it with a stored checksum that represents a checksum of a known or expected state of the files used to launch the instance. In other embodiments, other verification methodologies can be used such as hash functions and fingerprints.

Since the customers of the service provider may only be willing to download data to or otherwise interact with trusted users, the configuration integrity verifier provided by the service provider can provide such trust by providing a reliable data integrity mechanism. In this way, a trust model as described herein may provide a trust mechanism between three parties—the service provider (the trust provider), a customer of the service provider (the trust requestor), and an end user of products or services of the customer of the service provider. In one embodiment, the service provider, who typically owns and operates the computing hardware, may receive a software configuration that a customer provides. The service provider may record or audit what is loaded on a virtual resource requested by the customer using a data integrity mechanism such as a checksum. The checksum may be provided by the service provider to the customer when the software configuration is loaded or otherwise when requested by the customer, such as before the end user interacts with the virtual resource. The service provider may also provide other information such as templates and an audit log including names of loaded files. The customer who requested the instance with the software configuration does not need to provide any additional verification to any third-party requestors since the service provider can provide all the verification needed by the third-party requestor.

In an embodiment, the audit information can be sent from the service provider to the third-party requestor, thus allowing the third-party requestor to rely on the audit and checksum information directly from the service provider. The third-party requestor may verify that the checksum and other information received from the service provider matches what the third-party requestor expects. In some embodiments, the third-party requestor may provide a detailed set of information for instantiating a virtual machine, such as the hard disk image, boot-loader, boot-loader configuration, hardware configuration (e.g., processor and memory), and the like.

A checksum is one example of a data integrity mechanism that may be used in the embodiments disclosed herein. As mentioned, any mechanism for verifying data integrity can be used, such as a hash function or a fingerprinting algorithm. In one embodiment, a public-key infrastructure (PKI) may be used. In some embodiments, a trusted platform module function may be included with a computing device. The trusted platform module may include an endorsement private key that uniquely identifies the trusted platform module and thus the physical host. The trusted platform module may also include cryptographic functions. The hardware manufacturer may sign the corresponding public key to guarantee the integrity of the trusted platform module and validity of the key. Trusted platforms may leverage the features of a trusted platform module to enable verification. For example, at boot time, the host (e.g., the instance manager) may compute a measurement list consisting of hashes of the software involved in the boot sequence (e.g., the BIOS, the boot-loader, and the software implementing the platform). The measurement list may be securely stored inside the host's trusted platform module. To provide confirmation to configuration verification service 180, the service may challenge the host with a nonce (e.g., a sequence used to sign a cryptographic communication). The configuration verification service 180 may request the local trusted platform module to create a message containing both the measurement list and the nonce. The message may be encrypted with the trusted platform module's private key. The host may then send the message to the configuration verification service 180 who may then decrypt the message using the private key's corresponding public key, thereby authenticating the host. The configuration verification service 180 can then store the verified list and send the verified list or information based at least in part on the verified list to third-party requestors. By checking that the nonces match and that the measurement list corresponds to a configuration that is deemed to be trusted, a third-party requestor can identify the platform on an untrusted host. By using a trusted platform module, a provider of content may be assured that content is only downloaded to trusted devices that have not been tampered with or altered.

In some embodiments, an additional or fourth party may be used as a verification service to provide an optional or additional level of verification. For example, a fourth-party verifier may audit and verify that the service provider is employing reliable load and verification processes and is to be trusted.

Figure 3:
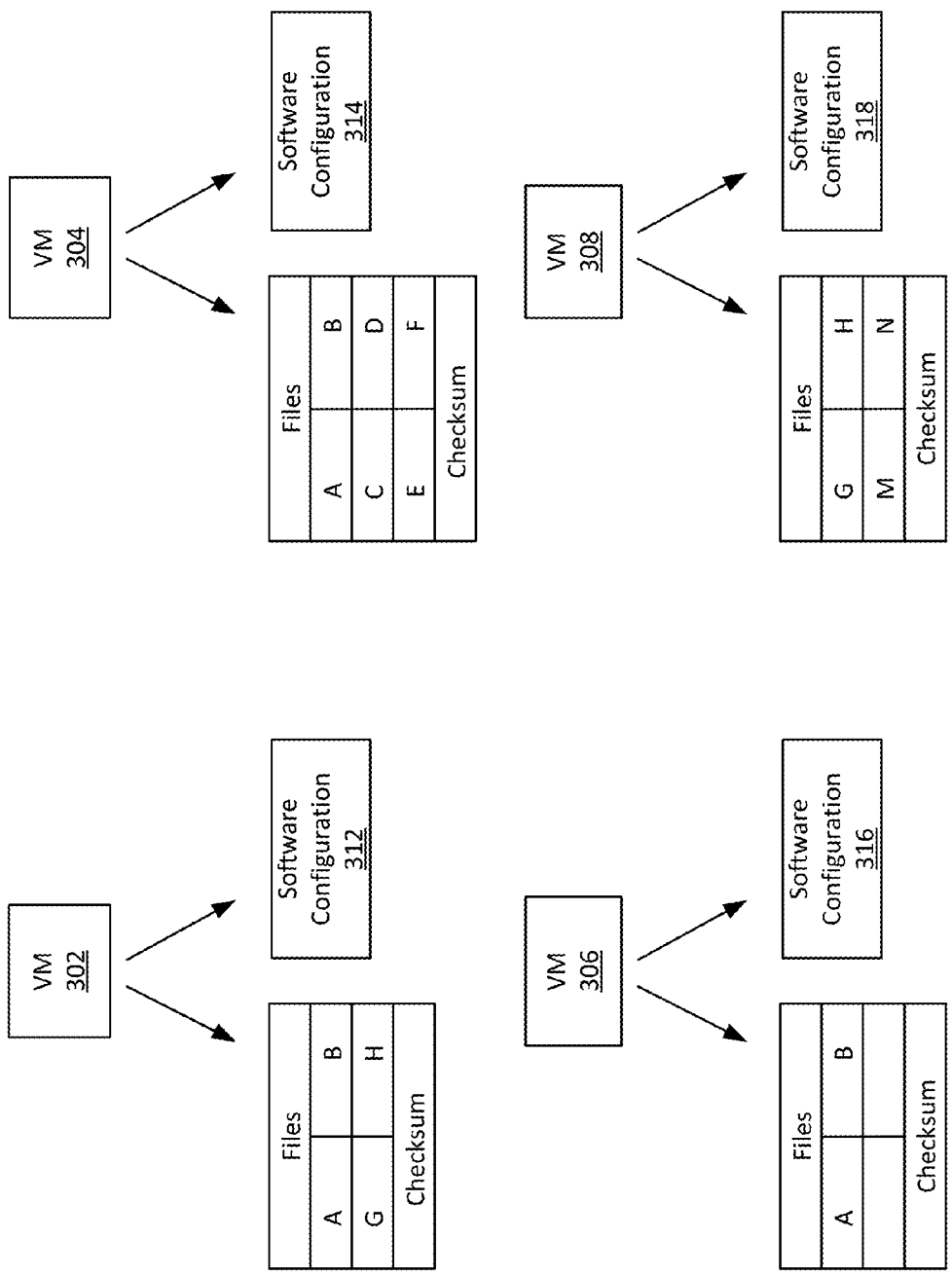
FIG. 3 is a diagram illustrating a mechanism for providing a configuration verification service in accordance with the present disclosure.

FIG. 3 illustrates one embodiment in which a configuration verification service is provided. FIG. 3 includes virtual machine instances 302, 304, 306, and 308. In the figure, virtual machine instance 302 includes files A, B, G, and H and a checksum. Virtual machine instance 304 includes files A, B, C, D, E, and F and a checksum. Virtual machine instance 306 includes files A and B and a checksum. Virtual machine instance 308 includes files G, H, M, and N and a checksum. Each of the virtual machine instances 302, 304, 306, and 308 may be associated with respective software configurations 312, 314, 316, and 318. As an example, software configuration 312 may include a particular operating system.

Figure 4:
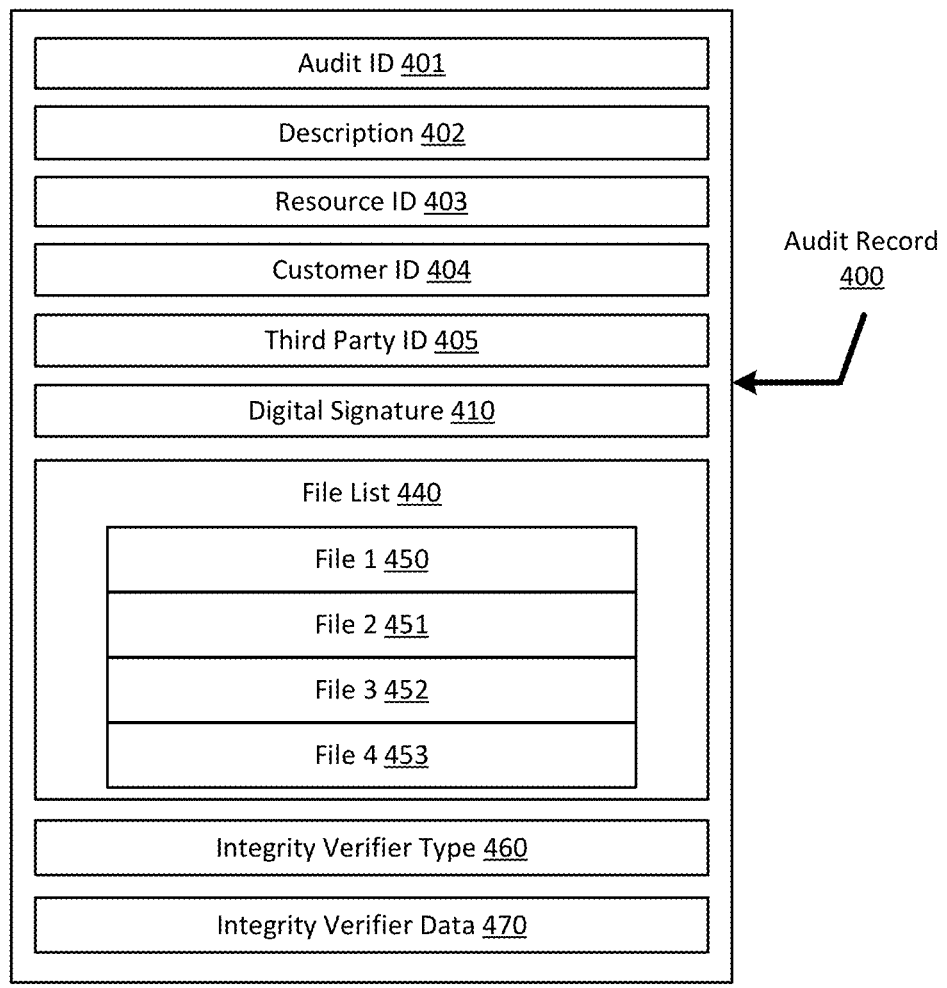
FIG. 4 is a diagram illustrating an audit record in accordance with the present disclosure.

FIG. 4 illustrates an example of an audit record 400. A subset of the elements or fields shown in FIG. 4 may be implemented in some embodiments, and not all the implemented fields may be populated. When an audit record 400 is created, a new audit ID 401 may be created that may be used to uniquely identify the audit record 400. In some embodiments, a description field 402 may be provided by a user or administrator. A data center network in which the audit record is to be used may comprise a plurality of computing resources such as virtual machine instances in some embodiments. Audit record 400 may contain resource ID 403 in such cases. For example, the operator of a provider network may establish a logical partition for a particular customer by setting aside a set of service platforms, a set of network address ranges, other equipment or resources, and network administration capabilities for exclusive use by that customer.

Customer ID 404 may be used to identify a customer that requested a resource. Third Party ID 405 may identify one or more third parties who may be authorized to request some or all or the contents of audit record 400. In one embodiment, a policy authorizing a third party to request and receive audit record 400 may be created by a customer. The configuration verification service 180 may receive requests for audit records and check the policy to determine if the policy authorizes the requesting third party to view or receive the record.

Audit record 400 may include a digital signature 410 of the configuration verification service 180. File list 440 may include a list of data such as file names that were loaded on the resource identified by resource ID 403. For example, file list 440 may include files 450, 451, 452, and 453. Integrity verifier type 460 may identify the type of data integrity methodology used to verify the contents of file list 440. Integrity verifier data 470 may store the value of the integrity verifier.

In one embodiment, some of the fields shown in FIG. 4 may be replaced by references or pointers to other objects. For example, data for audit record 400 may be stored in a separate data object, and the audit record 400 may store a reference to the data object.

Figure 5:
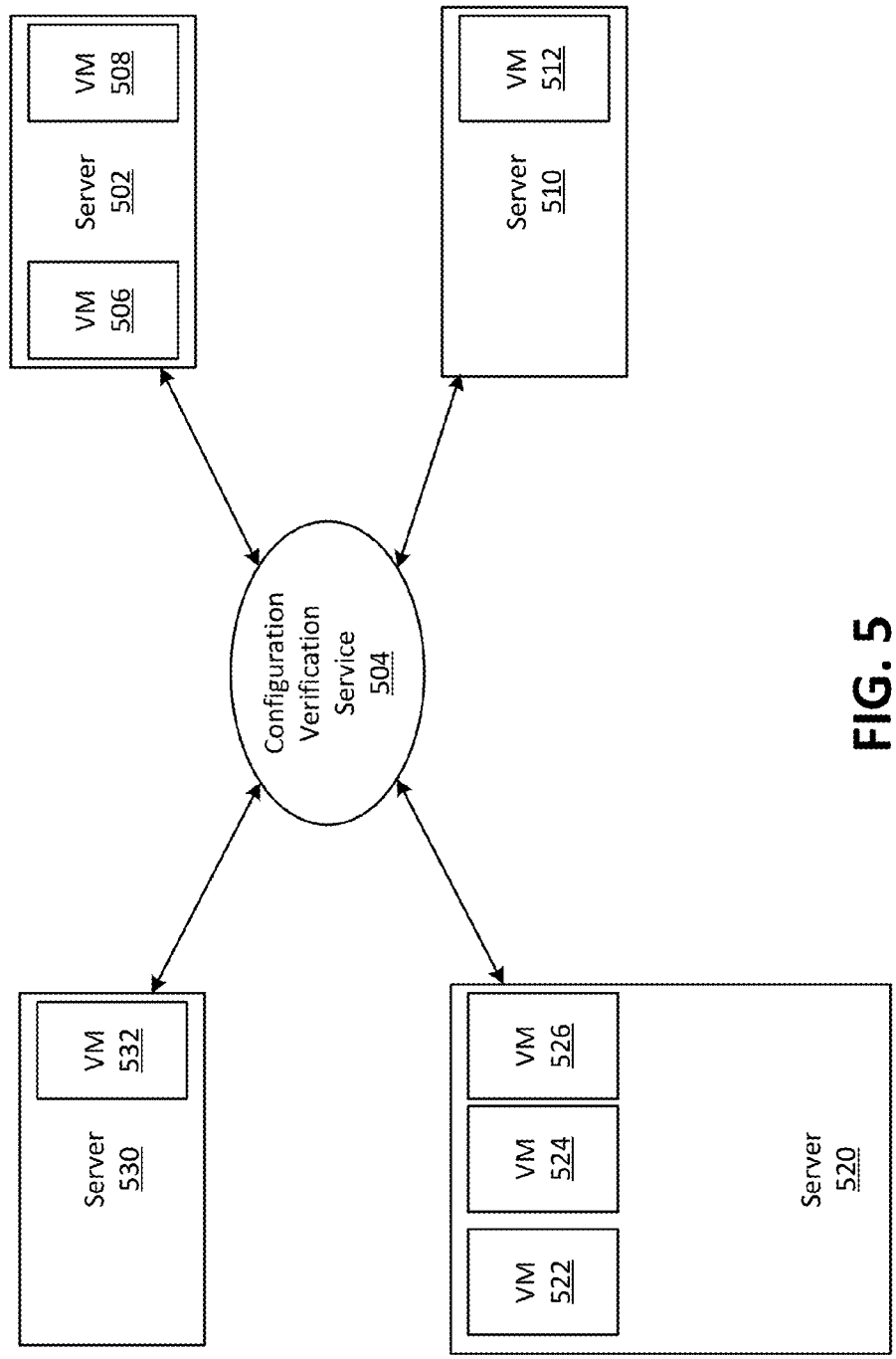
FIG. 5 is a diagram illustrating a mechanism for providing a configuration verification service in accordance with the present disclosure.

FIG. 5 illustrates an example computing environment in which the embodiments described herein may be implemented. Referring to the figure, server computers 502, 510, 520, and 530 may communicate with a configuration verification service 504 so that software and data information can be audited. The audit information may be stored in a data store on one of the server computers 502, 510, 520, and 530 or in a data store that is part of the configuration verification service 504 (not shown). Configuration verification service 504 may in some embodiments correspond to configuration verification service 180 as depicted in FIG. 1. Server computer 502 may host virtual machine instances 506 and 508. Similarly, server computer 510 may host virtual machine instance 512; server computer 520 may host virtual machine instances 522, 524, and 526; and server computer 530 may host virtual machine instance 532.

Server computer 502 may send an indication to configuration verification service 504 that virtual machine 532 will be launched, and in response configuration verification service 504 may initiate a configuration verification process. Configuration verification service 504 may interact with server computer 502's load and configuration processes to generate a record of files and data used to launch the instance. Furthermore, configuration verification service 504 may generate a configuration integrity verifier based on the installed files and data. In another configuration, server 502 may generate a record of installed files and data for virtual machine 506 or 508 and send the record to configuration verification service 504 for storage. The configuration verification service 504 can vend the records, or information based on the records, to third parties. In an embodiment, the instance manager can be configured to generate records in response to a request from the customer. For example, the customer can submit a request to the service provider (via a console or an API) to indicate a preference that the configuration verification service 504 generate records for certain instances. Similarly, when launching an instance the customer can add a parameter to the API call indicating that record generation is enabled. When the instance is launched by the service provider, the request to generate records can be propagated to the host, which in turn can enable the configuration verification process.

In some embodiments, the request for the configuration verification may be sent to configuration verification service 504 from server computer 502 on behalf of one of the other server computers 510, 520, and 530. In other embodiments, a third party such as a service executing on one of the server computers 502, 510, 520, and 530, or executing on another computing device, may send the request on behalf of one or more of the server computers 502, 510, 520, and 530.

Configuration verification service 504 may be implemented as a distributed system and can reside on one or more server computers and/or other computing resources in one or more data centers. Configuration verification service 504 may in some embodiments be managed by a VMM or other management software executing in the data center. Configuration verification service 504 may also execute on one or more virtual machines.

Figure 6:
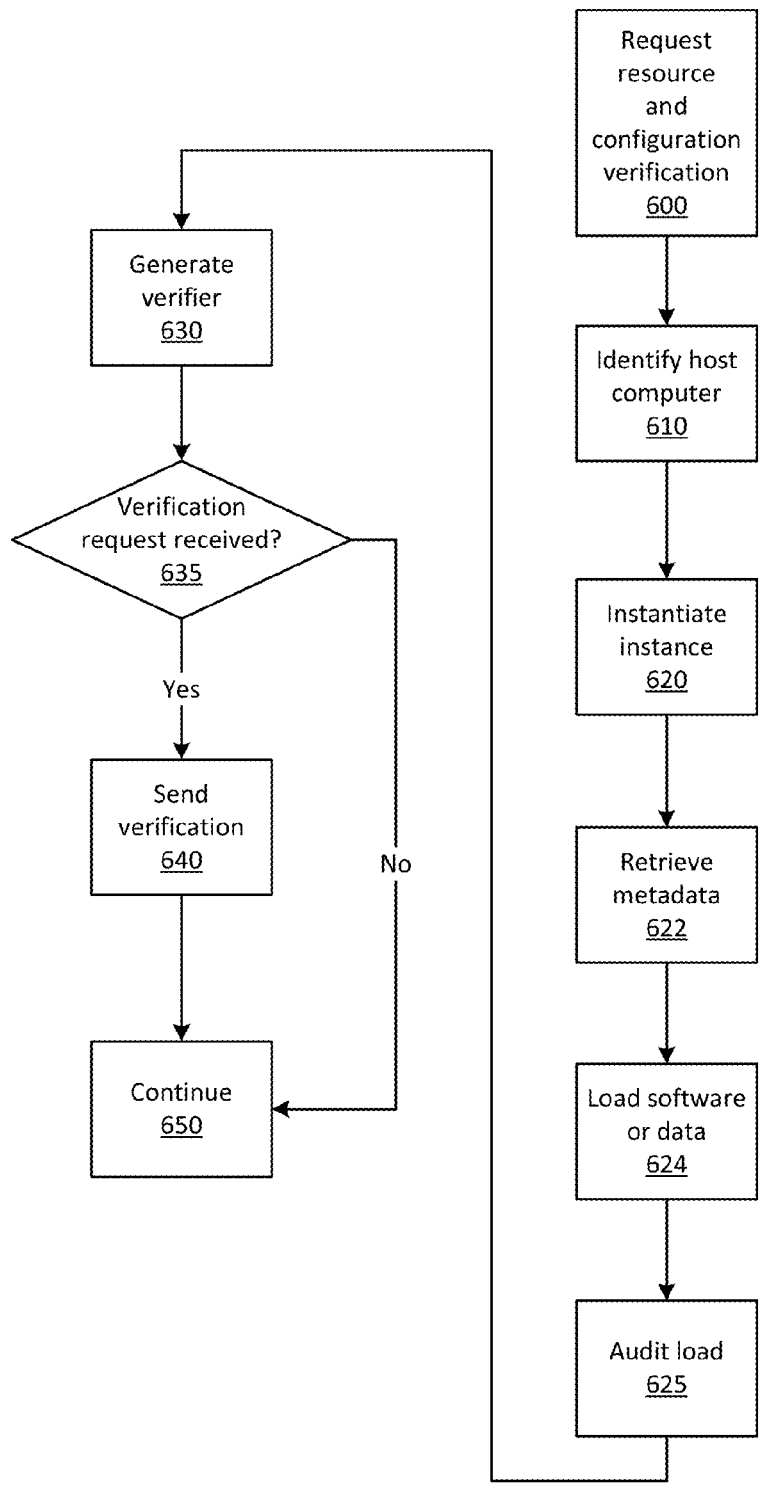
FIG. 6 is a flowchart depicting an example procedure for providing a configuration verification service in accordance with the present disclosure.

FIG. 6 illustrates an example operational procedure for providing a configuration verification service. In an embodiment, a data center may provide customers with one or more instances of virtualized computer resources and/or storage resources. In operation 600, a customer may request a computing resource such as a virtual instance and request that a particular software configuration and data be deployed. For example, a customer may submit an API call to a compute service that indicates an action to perform (e.g., RunInstances) and an image to launch. A customer may also request verification of the configuration for the image. In one embodiment, the customer may create a policy to allow the configuration verification information to be provided to a third party. The policy can also specify whether the third-party will be allowed access to the configuration audit records or just the result of the configuration verification. The request for verification configuration and/or the policy may be stored as metadata attached to the instance image. A configuration verification service as described above, for example, corresponding to the net configuration verification service 180 depicted in FIG. 1 and/or the configuration verification service 504 depicted in FIG. 5, may be invoked. In operation 610, a placement service running in the data center (not illustrated) may identify a resource that may provide the requested computing resource such as a computer server in the data center.

In operation 620, the requested computing resource may be brought online. If the requested computing resource is a virtual machine, then the virtual machine may be instantiated on the identified server computer. In operation 622, the configuration verification metadata may be read and a request to enable configuration verification functionality may be pushed to the host as part of the launch request. In operation 624 the requested software and data may be loaded. In one embodiment, the successful launch of the instance may include sending to the customer an instanceID or some other token that maps to the instanceID. In some embodiments, the token may be an encrypted version of the instanceID.

In operation 625, the software and data being loaded by the host can be audited. For example, the instance manager can track the software files and data loaded by the instance and generate a record using the information. In operation 630, an integrity verifier, such as a checksum can be generated. For example, the instance manager can generate a checksum for each file that was loaded and/or for the collection of files there were loaded by the instance as part of a boot procedure. Alternatively, the configuration integrity verifier can be generated by the configuration verification service. For example, the files that were used to boot during the boot operation can be sent to the configuration verification service, which can generate one or more checksums. As noted herein, the sequence of these operations need not be sequential and can be performed in parallel. For example, the configuration verification service may audit the loaded software and data and generate the configuration integrity verifier while the software and data are being loaded.

In operation 635, it is determined whether a verification request has been received. If a verification request has been received, then in operation 640 the instanceID or token may be provided to the third-party requesting the verification. In some embodiments, the third party may query an API for verification and pass the instanceID or token via the API. The policy created by the customer may be checked to determine if the third party is authorized to receive the verification information. Depending on the policy, the results of the audit and/or the configuration integrity verifier may be provided.

Figure 7:
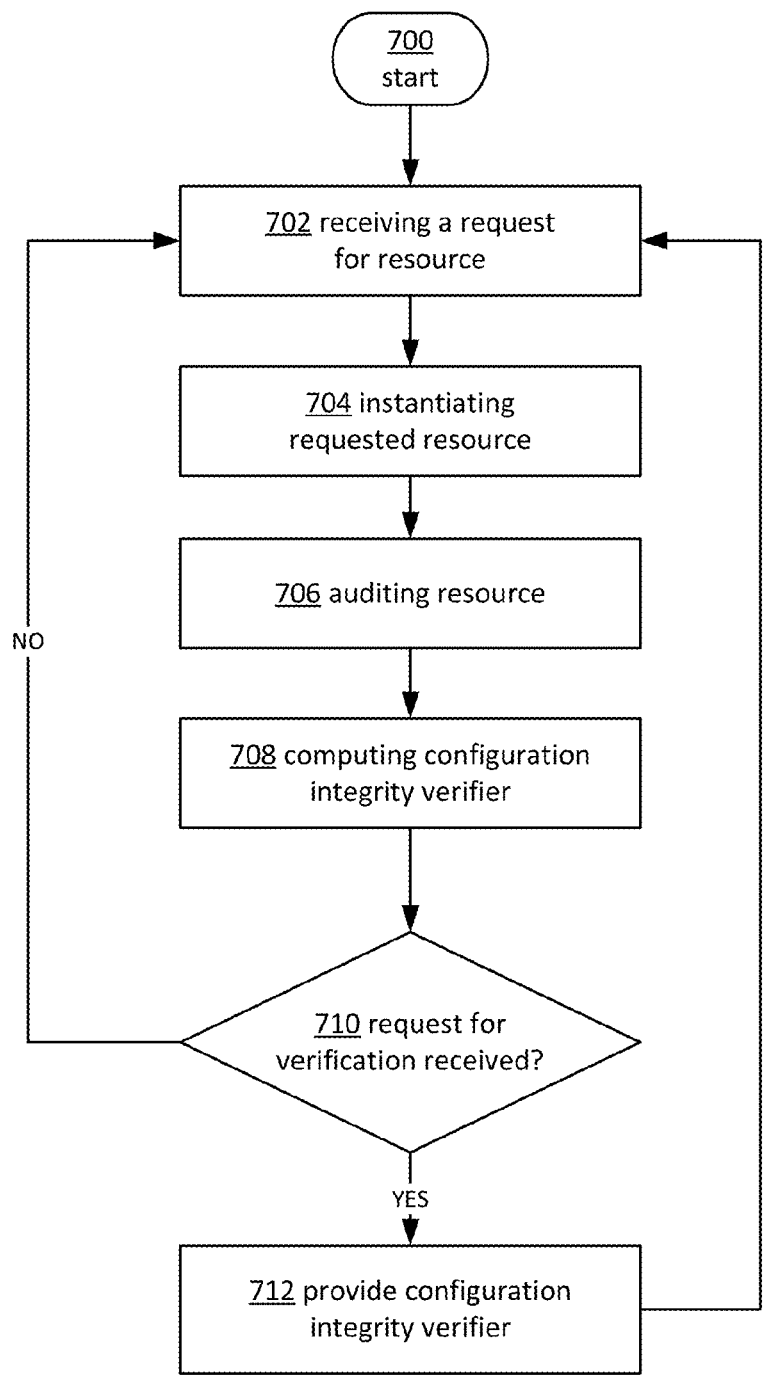
FIG. 7 is a flowchart depicting an example procedure for providing a configuration verification service in accordance with the present disclosure.

FIG. 7 illustrates an example operational procedure for verifying a computing configuration. Referring to FIG. 7, operation 700 begins the operational procedure. Operation 700 may be followed by operation 702. Operation 702 illustrates receiving a request for a virtual resource and a configuration for the virtual resource. In an embodiment, the request may be received in a computing environment comprising a plurality of computing devices providing computing resources. Additionally and optionally, the configuration may include at least one software configuration for which integrity verification has been requested by a provider of the at least one software configuration.

Operation 702 may be followed by operation 704. Operation 704 illustrates instantiating the requested virtual resource in accordance with the requested configuration in response to receiving the request for the virtual resource. Operation 704 may be followed by operation 706. Operation 706 illustrates auditing the instantiated virtual resource to generate a record of loaded software and data. Operation 706 may be followed by operation 708. Operation 708 illustrates computing a configuration integrity verifier based on the record of loaded software and data and the requested configuration.

Operation 708 may be followed by operation 710. Operation 710 illustrates determining if a request for verification of the loaded configuration has been received. If no request has been received, then operation 710 may be followed by operation 702.

If a request for verification of loaded configuration has been received, then operation 710 may be followed by operation 712. Operation 712 illustrates providing the configuration integrity verifier. In an embodiment, the service provider may expose an API for querying the integrity of a given instance and third parties, such as a company that uses the functionality provided by the instance, can submit queries to the API before interacting with the instance. When interacting with the API, a third party can specify an action such as VerifyInstanceConfiguration and pass the InstanceId of the instance, a public IP address of the instance, and/or a token as a parameter. After the request is received, a request to verify the instance configuration can be routed to the configuration verification service. The configuration verification service can authenticate the request from the third party and determine whether the third party is authorized to receive configuration information for the instance. For example, the configuration verification service can communicate with an identity service to check whether the third-party has sufficient privileges. If the third-party has sufficient privileges, the configuration verification service can send the record to the third party. Alternatively, the configuration verification service can return a "true" or "verified" response back to the third party. This configuration can be used to keep the details of what software was actually loaded from being distributed to the third-party and can be specified in a policy. The configuration integrity verifier may be used as a trusted third-party verification that the loaded software and data provides the requested configuration. For example, in response to a request for verification by the provider of the at least one software configuration or in response to a request by a user of the instantiated virtual resource for verification of the at least one software configuration, the configuration integrity verifier and information regarding the audited instantiated virtual resource and the record of loaded software and data is sent to the provider of the at least one software configuration.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system configured to manage virtual machine instances on behalf of a plurality of users, the computing system comprising:
    at least one computing device; and
    at least one memory in communication with the at least one computing device, the at least one memory having stored thereon computer readable instructions that, when executed by the computing system, cause the computing system to at least:
    receive a request for one or more virtual machine instances;
    in response to receiving the request for the one or more virtual machine instances, instantiate a virtual machine instance, wherein instantiating the virtual machine instance includes loading software and data associated with a configuration for the virtual machine instance;
    audit the instantiated virtual machine instance to generate a record of the loaded software and data;
    compute a configuration integrity verifier based on the record of the software and data and the configuration for the instantiated virtual machine instance; and
    in response to a request for verification of the software and data, provide the configuration integrity verifier, information regarding the audited instantiated virtual machine instance, and the record of loaded software and data as a trusted third party verification that the software and data were used to instantiate the virtual machine instance.

2. The system according to claim 1, wherein the configuration integrity verifier comprises a checksum.

3. The system according to claim 1, wherein the request for verification of the software and is received from a provider of the configuration or a user of the instance.

4. The system according to claim 1, wherein a provider of the configuration integrity verifier is validated by a verification service.

5. The system according to claim 1, wherein the configuration integrity verifier is validated by a digital certificate in a public-key infrastructure.

6. The system according to claim 1, wherein permission to provide verification of the software and is authorized by a requestor of the instance.

7. A method for verifying a computing configuration by a provider network providing virtualized computing resources to a plurality of users, the method comprising:
    receiving a request for one or more virtualized computing resources, wherein providing the one or more virtualized computing resources includes loading of code and data;
    in response to receiving the request for the one or more virtualized computing resources, instantiating a virtualized computing resource including loading code and data associated with the instantiated virtualized computing resource;
    auditing said loaded code and data associated with the instantiated virtualized computing resource to generate a record of the loaded code and data associated with the instantiated virtualized computing resource;
    computing a configuration integrity verifier based on the record of the loaded code and data associated with the instantiated virtualized computing resource; and
    sending the configuration integrity verifier in response to a request for verification of the loaded code and data associated with the instantiated virtualized computing resource, the configuration integrity verifier being usable as a trusted verification of the loaded code and data associated with the instantiated virtualized computing resource.

8. The method of claim 7, wherein the request is received in a computing environment comprising a plurality of computing devices providing computing resources.

9. The method of claim 7, wherein the virtualized computing resource is a virtual machine.

10. The method of claim 7, wherein the configuration integrity verifier is sent to a provider of the code and data in response a request from the provider of the code and data for verification of the code and data.

11. The method of claim 7, wherein the configuration integrity verifier is sent to a user of the code and data in response a request by the user of the computing resource for verification of the code and data.

12. The method of claim 7, wherein the configuration integrity verifier is sent to a provider of the code and data prior to a user of the computing resource accessing the computing resource.

13. The method of claim 7, wherein the configuration integrity verifier comprises a checksum.

14. The method of claim 7, wherein the configuration integrity verifier is validated by a digital certificate in a public-key infrastructure.

15. A non-transitory computer-readable storage medium having stored thereon computer-readable instructions, the computer-readable instructions comprising instructions that upon execution on a computing node, at least cause:
  in response to receiving a request for one or more virtualized computing resources, wherein the request includes a configuration requiring loading of code and data, providing the requested one or more virtualized computing resources in accordance with the requested configuration including said code and data;
  auditing the one or more virtualized computing resources to generate records of the loaded code and data;
  computing configuration integrity verifiers based on the records of the loaded code and data; and
  presenting the records as a trusted verification of the loaded code and data.

16. The non-transitory computer-readable medium of claim 15 wherein said presenting is in response to a request by the virtualized computing resource to access functionality provided by said code and data.

17. The non-transitory computer-readable medium of claim 16 wherein said presenting comprises sending the configuration integrity verifier to a provider of the code and data.

18. The non-transitory computer-readable medium of claim 16 wherein said presenting comprises sending the configuration integrity verifiers to a service provider authorized by a provider of the code and data.

19. The non-transitory computer-readable medium of claim 16 wherein the virtualized computing resource is a virtual computing instance.

20. The non-transitory computer-readable medium of claim 16 wherein the configuration integrity verifiers comprises a checksum.

21. One or more non-transitory computer-readable storage media having collectively stored thereon executable instructions that, when executed by one or more processors of a computer system, cause the computer system to at least implement:
  an application programming interface sub-system configured to:
    receive first electronic messages that encode identifiers indicative of requests for providing virtualized computing resources to a plurality of users, wherein providing the plurality of virtualized computing resources includes loading of code and data; and
    in response to receiving one of the electronic messages, sending second electronic messages indicative of instructions to cause:
      loading of a requested virtualized computing resource including code and data associated with the requested virtualized computing resource;
      auditing said loading to generate a record of the loaded code and data associated with the requested virtualized computing resource; and
      computing a configuration integrity verifier based on the record of the loaded code and data associated with the requested virtualized computing resource.

22. The non-transitory computer-readable storage media of claim 21 wherein the second electronic messages are indicative of instructions to cause sending the configuration integrity verifier in response to third electronic messages that encode identifiers indicative of requests for verification of the loaded code and data associated with the requested virtualized computing resource, the configuration integrity verifier being usable as a trusted verification of the loaded code and data associated with the requested virtualized computing resource.

* * * * *